(12) United States Patent
Towata

(10) Patent No.: US 8,817,300 B2
(45) Date of Patent: Aug. 26, 2014

(54) METHOD AND APPARATUS TO EDIT AND PRINT DOCUMENTS USING A WEB BROWSER

(75) Inventor: Hiroaki Towata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 13/206,006

(22) Filed: Aug. 9, 2011

(65) Prior Publication Data

US 2012/0050799 A1 Mar. 1, 2012

(30) Foreign Application Priority Data

Aug. 26, 2010 (JP) ................................ 2010-189474

(51) Int. Cl.
*G06F 3/12* (2006.01)
(52) U.S. Cl.
USPC .......... 358/1.15; 709/206; 709/245; 715/205; 715/234; 715/255
(58) Field of Classification Search
USPC ...................... 358/1.15, 1.1, 1.13, 1.14, 1.18; 400/162; 705/26.5, 40; 709/206, 217, 709/245, 246; 715/205, 234, 243, 255, 273, 715/781; 726/17
See application file for complete search history.

(56) References Cited

U.S. PATENT DOCUMENTS

| | | | | |
|---|---|---|---|---|
| 6,247,011 B1* | 6/2001 | Jecha et al. | ............................ | 1/1 |
| 6,292,813 B1* | 9/2001 | Wolfe | ............................ | 715/205 |
| 2002/0073124 A1* | 6/2002 | Masuda et al. | ................. | 707/526 |
| 2002/0085224 A1* | 7/2002 | Price et al. | .................... | 358/1.13 |
| 2003/0035144 A1* | 2/2003 | Shima | ........................... | 358/1.18 |
| 2003/0053122 A1* | 3/2003 | Kinoshita | ..................... | 358/1.15 |
| 2003/0065638 A1* | 4/2003 | Robert | .............................. | 707/1 |
| 2003/0065739 A1* | 4/2003 | Shnier | ........................... | 709/217 |
| 2004/0044622 A1* | 3/2004 | Blott et al. | ....................... | 705/40 |
| 2004/0044966 A1* | 3/2004 | Malone | .......................... | 715/530 |
| 2004/0088647 A1* | 5/2004 | Miller et al. | ................... | 715/500 |
| 2004/0221231 A1* | 11/2004 | Madril et al. | ................... | 715/527 |
| 2005/0268215 A1* | 12/2005 | Battagin et al. | ............... | 715/503 |
| 2006/0129923 A1* | 6/2006 | Tsykora | ......................... | 715/527 |
| 2006/0156230 A1* | 7/2006 | Matsubayashi et al. | ....... | 715/527 |
| 2007/0091329 A1* | 4/2007 | Zhang | ............................ | 358/1.1 |
| 2007/0146778 A1* | 6/2007 | Kitagata et al. | .............. | 358/1.15 |
| 2008/0148146 A1* | 6/2008 | Estrada et al. | ................. | 715/255 |
| 2008/0195712 A1* | 8/2008 | Lin et al. | ........................ | 709/206 |
| 2009/0033976 A1* | 2/2009 | Ding | ........................... | 358/1.15 |
| 2009/0235161 A1* | 9/2009 | Williams et al. | .............. | 715/255 |
| 2009/0249239 A1* | 10/2009 | Eilers | ............................ | 715/769 |
| 2011/0276897 A1* | 11/2011 | Crevier et al. | ................. | 715/752 |

FOREIGN PATENT DOCUMENTS

JP 2002-169671 A 6/2002

* cited by examiner

*Primary Examiner* — David S Cammack
(74) *Attorney, Agent, or Firm* — Canon USA, Inc., IP Division

(57) ABSTRACT

A print server apparatus includes a receiving unit, an extraction unit, an acquisition unit, and an instruction unit. The receiving unit receives a URL displayed on an edit screen of a document from a client device, wherein the edit screen is provided by a web application on a web application server and is displayed on a web browser to use the displayed edit screen, thereby executing edit processing of the document. The extraction unit extracts identification information used to identify document data corresponding to the document based on the received URL. The acquisition unit acquires the document data identified by the extracted identification information from the web application server that provides the edit screen. The instruction unit instructs a printing apparatus to print the acquired document data.

13 Claims, 14 Drawing Sheets

FIG.7

| URL REGULAR EXPRESSION | STORAGE METHOD |
|---|---|
| ^http[s]*://webapplicationA/View¥?(?<parameter>.+) | WEB APPLICATION A METHOD |
| ^http[s]*://webapplicationA/present/edit¥?(?<parameter>.+) | WEB APPLICATION A METHOD |
| ^http[s]*://webapplicationA/present/view¥?(?<parameter>.+) | WEB APPLICATION A METHOD |
| ^http[s]*://webapplicationB/EditMode¥?(?<parameter>.+) | WEB APPLICATION B METHOD |
| ^http[s]*://webapplicationB/ViewMode¥?(?<parameter>.+) | WEB APPLICATION B METHOD |
| ^http[s]*://webapplicationC/document/Web/doc¥?(?<parameter>.+) | WEB APPLICATION C METHOD |

FIG.8

| STORAGE METHOD | ACQUISITION METHOD |
|---|---|
| WEB APPLICATION A METHOD | BASIC ACQUISITION METHOD |
| WEB APPLICATION B METHOD | AUTHENTICATION ACQUISITION METHOD |
| WEB APPLICATION C METHOD | AUTHORIZATION ACQUISITION METHOD |

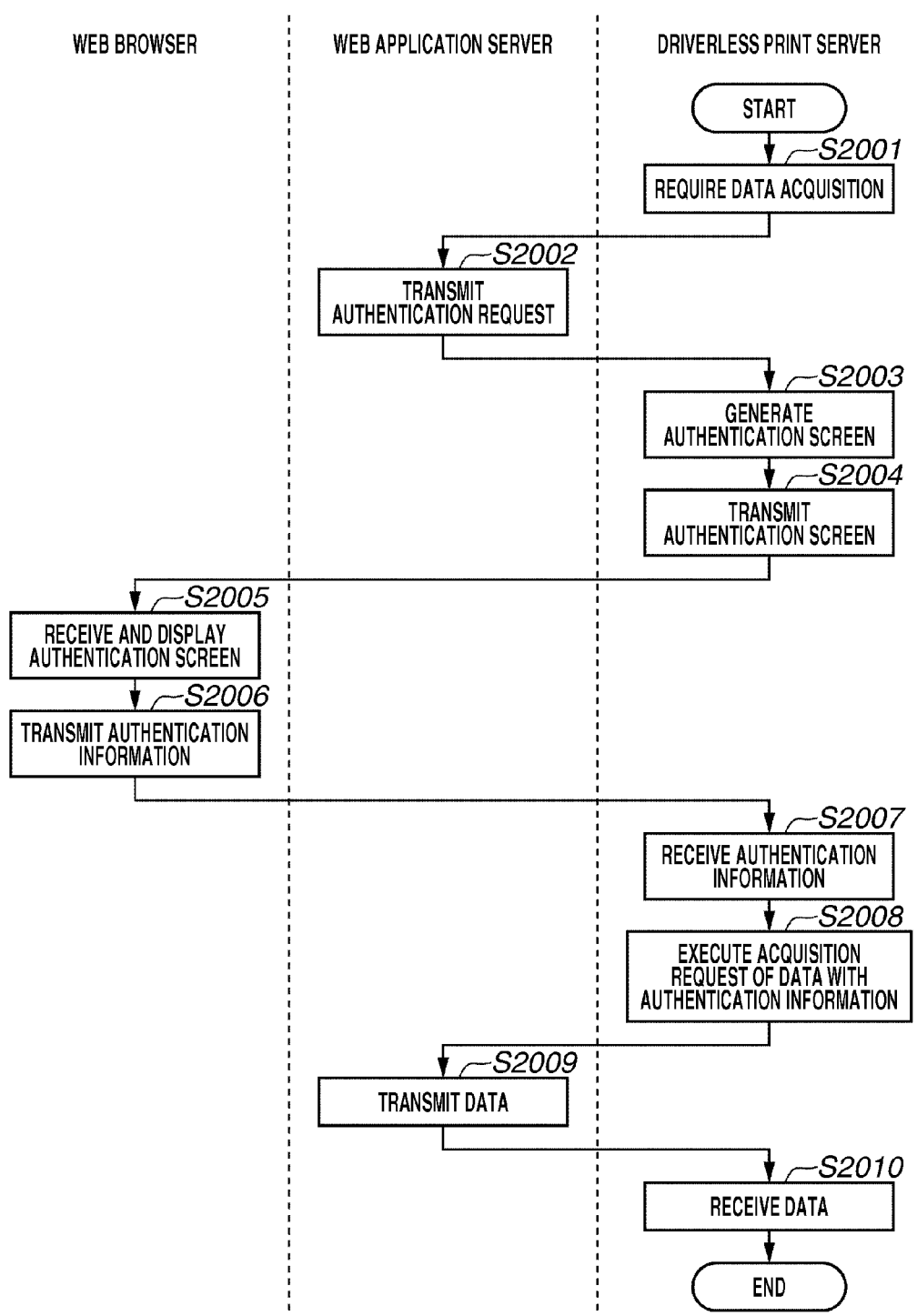

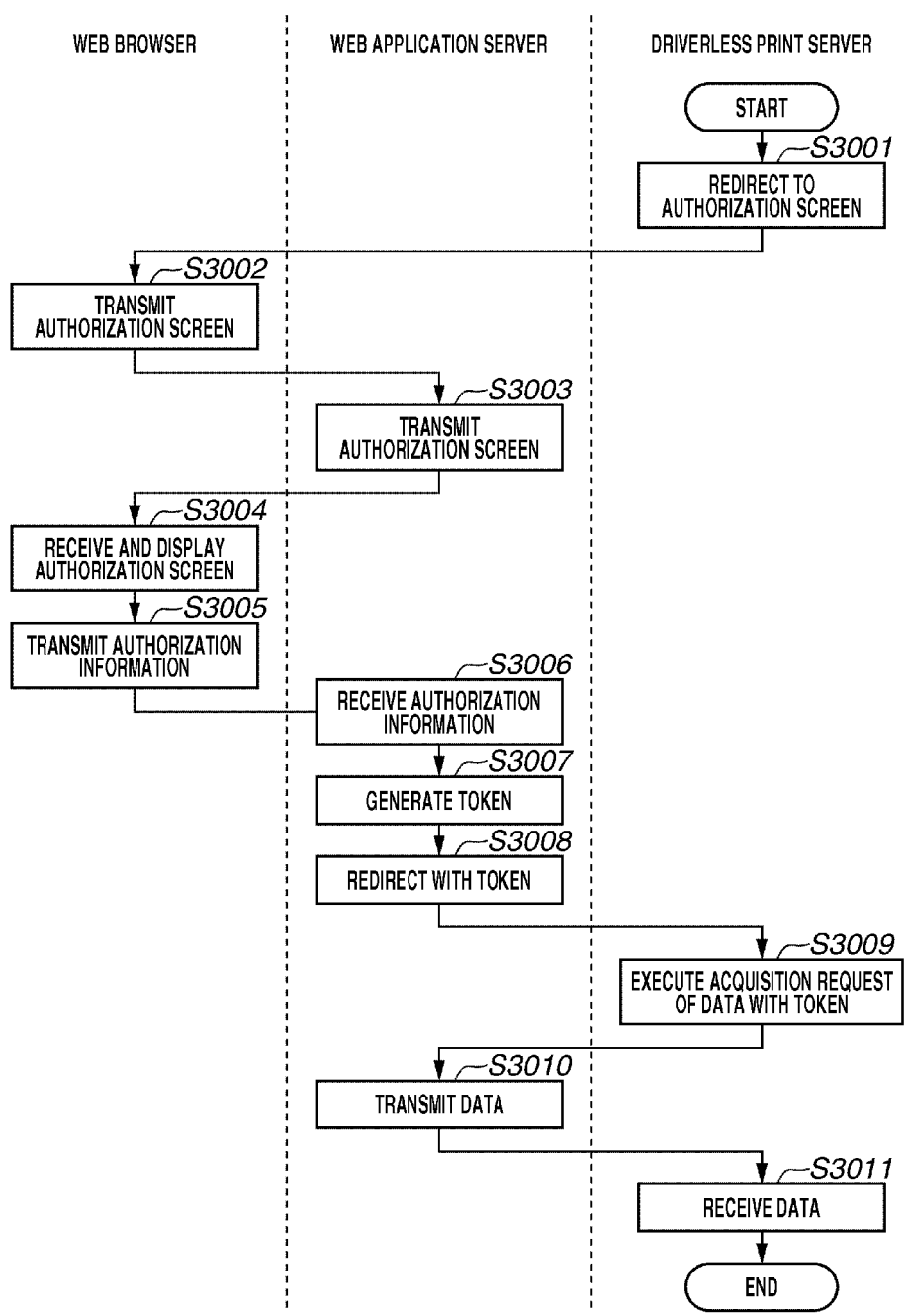

METHOD AND APPARATUS TO EDIT AND PRINT DOCUMENTS USING A WEB BROWSER

BACKGROUND OF THE INVENTION

1. Field of the Invention

The present invention relates to a print server apparatus, a printing apparatus, an information processing method, and a storage medium.

2. Description of the Related Art

In recent years, a system in which a web application provided by a web application server through a web browser on a client personal computer (PC) is used without installing the application on the client PC, has been widespread.

Such a web application includes one which is used to create and edit document data to store it in a storage on a web application server. Also in these web applications, an operation feeling similar to an application that is installed in a client PC is being realized using a technique such as Asynchronous JavaScript+XML (AJAX).

Such a use form is referred to as Software as a Service (SaaS) or cloud computing, and the increase of the use thereof has been accelerated. At present, in order to print document data stored in such a web application server, it is required to once download the document data through a web browser to instruct a printing apparatus to print it by a pre-installed printer driver.

On the other hand, there is a demand to intend to execute printing using only a web browser without requiring download of a document and installation of a printer driver. Such a printing method is referred to as driverless printing.

In Japanese Patent Application Laid-Open No. 2002-169671, as a method for executing driverless printing of document data stored in a web application server by a printing apparatus, a method is discussed in which a uniform resource locator (URL) is notified to the printing apparatus and the printing apparatus downloads the document data from the notified URL to execute printing.

In Japanese Patent Application Laid-Open No. 2002-169671, the URL displayed on a web browser when a user is browsing and editing a document is not a URL of the document data itself and may be a URL of a hypertext markup language (HTML) file of a web page to browse and edit a document. This possibility is in a case of a web application server such as cloud computing. In such a case, even if a URL displayed on the web browser is notified to the printing apparatus, the printing apparatus cannot acquire document data and hence it cannot execute printing.

SUMMARY OF THE INVENTION

The present invention is directed to a print server apparatus, a printing apparatus, and an information processing method capable of providing a function of driverless printing to a user who uses a web application that edits a document or the like.

According to an aspect of the present invention, a print server apparatus includes: a receiving unit configured to receive a URL displayed on an edit screen of a document from a client device, wherein the edit screen is provided by a web application on a web application server and is displayed on a web browser to use the displayed edit screen, thereby executing edit processing of the document; an extraction unit configured to extract identification information used to identify document data corresponding to the document based on the received URL; an acquisition unit configured to acquire the document data identified by the extracted identification information from the web application server that provides the edit screen; and an instruction unit configured to instruct a printing apparatus to print the acquired document data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a URL filter table in a driverless print server.

FIG. 8 illustrates an example of an acquisition method table in a driverless print server.

FIG. 13 is a flowchart illustrating an example of information processing according to a second exemplary embodiment.

FIG. 14 is a flowchart illustrating an example of information processing according to a third exemplary embodiment.

DESCRIPTION OF THE EMBODIMENTS

Various exemplary embodiments, features, and aspects of the invention will be described in detail below with reference to the drawings.

Figure 1:
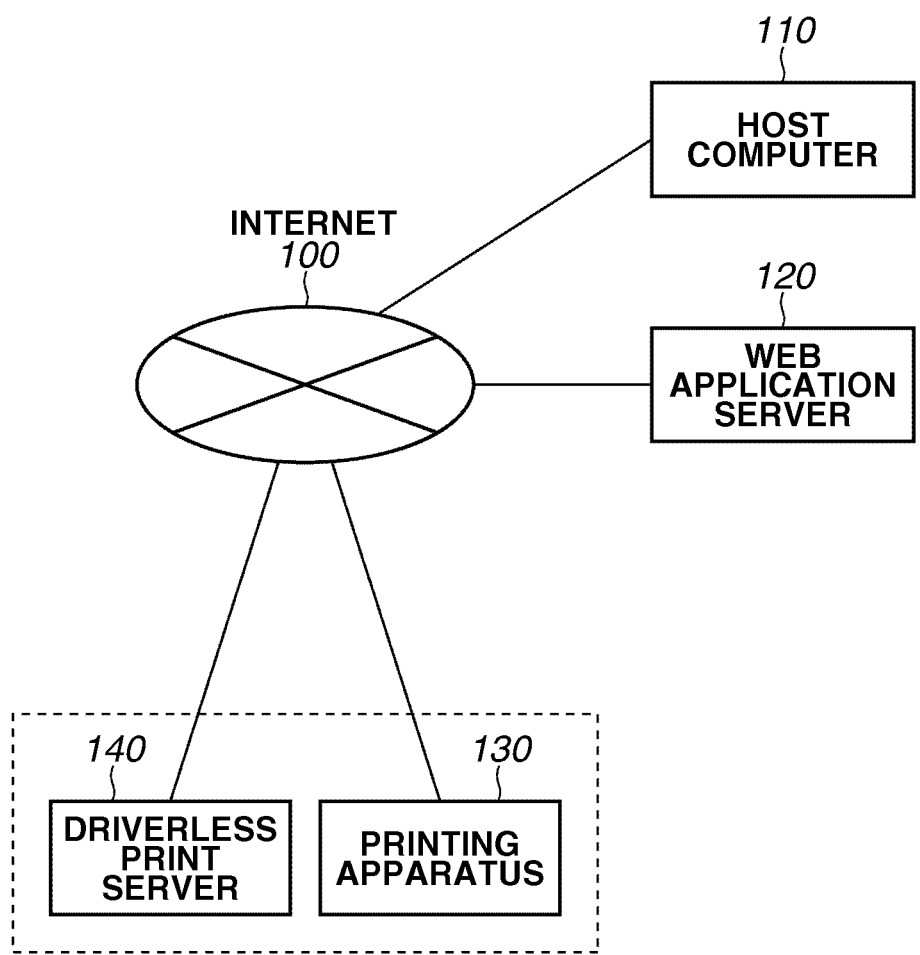
FIG. 1 illustrates an example system configuration of a printing system.

FIG. 1 illustrates an example of a system configuration of a printing system.

Figure 4:
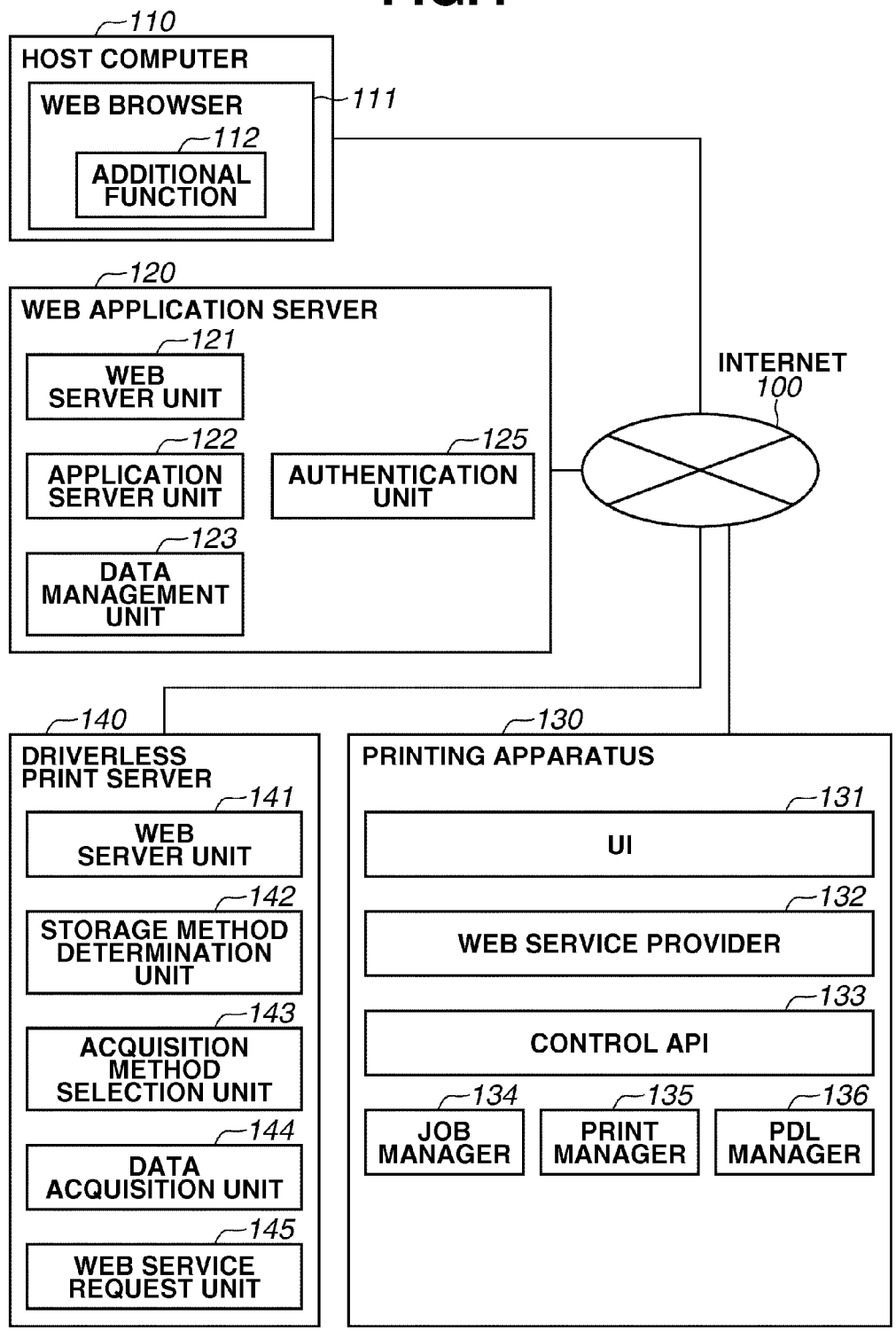
FIG. 4 is a block diagram illustrating an example of the software configuration of each device that constitutes a printing system.

A host computer 110 includes a web browser 111 illustrated in FIG. 4, which will be described below. The host computer 110 is connected to a web application server 120 with a hypertext transfer protocol (HTTP), and can be provided with a service. Particularly, a user utilizes a service to browse and edit document data provided by the web application server 120 using the web browser 111.

Further, the web browser 111 has an additional function 112. The host computer 110 is, for example, a personal computer (PC), a personal digital assistant (PDA), a mobile phone, or the like. The host computer 110 is connected to the Internet 100.

Figure 5:
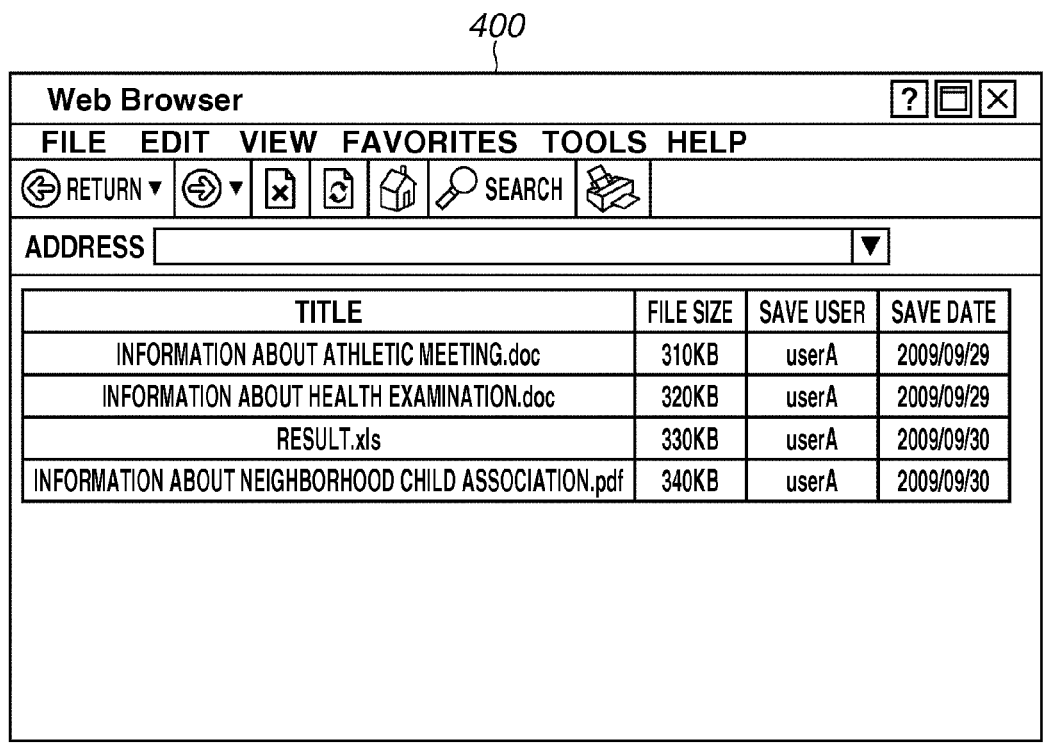
FIG. 5 illustrates an example of a document list screen provided by a web application server.
Figure 6:
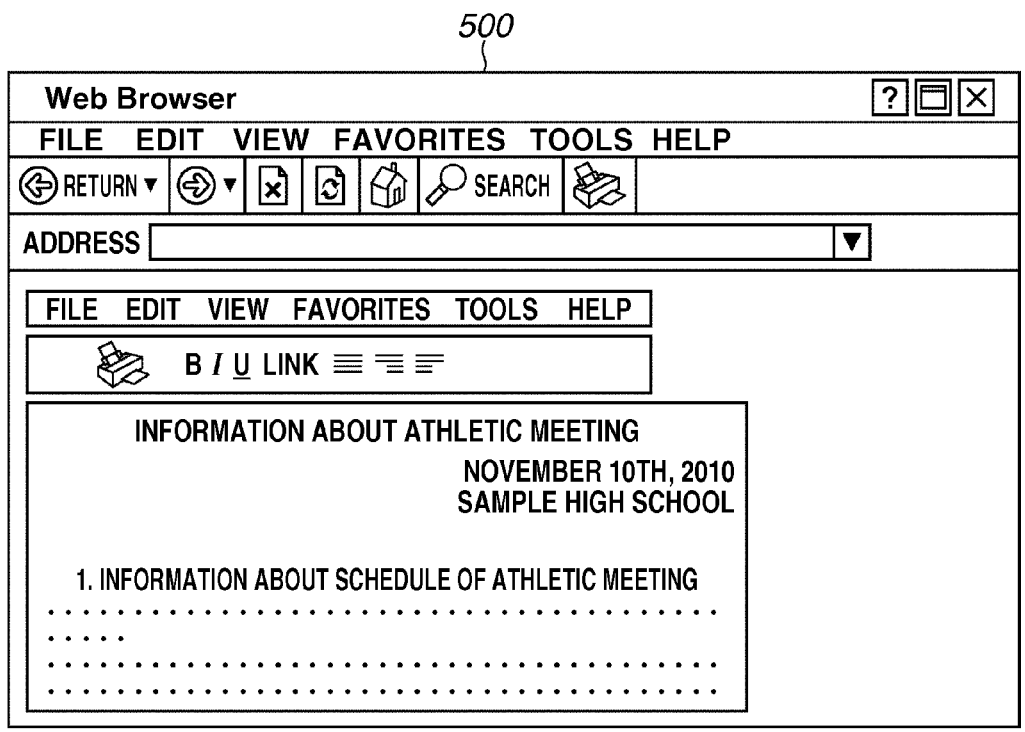
FIG. 6 illustrates an example of a document edit screen provided by a web application server.

On the web application server 120, a software process group for providing the function of browsing and generating document data using the web browser 111 as illustrated in FIG. 6, which will be described below, from the host computer 110 is operating. In FIGS. 5 and 6, which will be described below, a screen which the web application server 120 causes the web browser 111 to display is illustrated.

A screen illustrated in FIG. 5 is an example of a repository screen for listing document data managed by the web application server 120. A screen illustrated in FIG. 6 is a screen for browsing and displaying document data provided by the web application server 120. A user browses and edits document data on the screen illustrated in FIG. 6 using the web browser 111. The web application server 120 is connected to the Internet 100.

A printing apparatus 130 is a multi function peripheral (MFP) that executes input/output and transmission/reception of images, and various types of image processing. The printing apparatus 130 includes a printer 334 (i.e., image output device), a control unit 331, and an operation unit 332 (i.e., user interface).

The printer 334 and the operation unit 332 are connected to the control unit 331. The control unit 331 controls the printer 334 and the operation unit 332. The control unit 331 is connected to the Internet 100.

A driverless print server 140 is a server for providing a driverless printing function provided by the printing apparatus 130. The driverless print server 140 is not necessarily mounted on the printing apparatus 130. The driverless printing function may also be provided by a server (computer) of a separate casing (not illustrated).

The driverless print server 140 is notified of a URL by the additional function 112 on the web browser 111 to be described below. The driverless print server 140 acquires a document from the web application server 120 to be described below based on the notified URL, and instructs the printing apparatus 130 to print it. At this time, the notified URL is not a URL of the document itself. The notified URL is a URL of a web page used to browse and display a document.

Further, there is a plurality of the web application servers 120, and there is a suitable document acquisition method for each web application server 120. Thus, the driverless print server 140 analyzes the URL, specifies a document to be acquired, selects a document acquisition method optimal to the web application server 120 that stores documents, and acquires a document. The driverless print server 140 is connected to the Internet 100.

Figure 2:
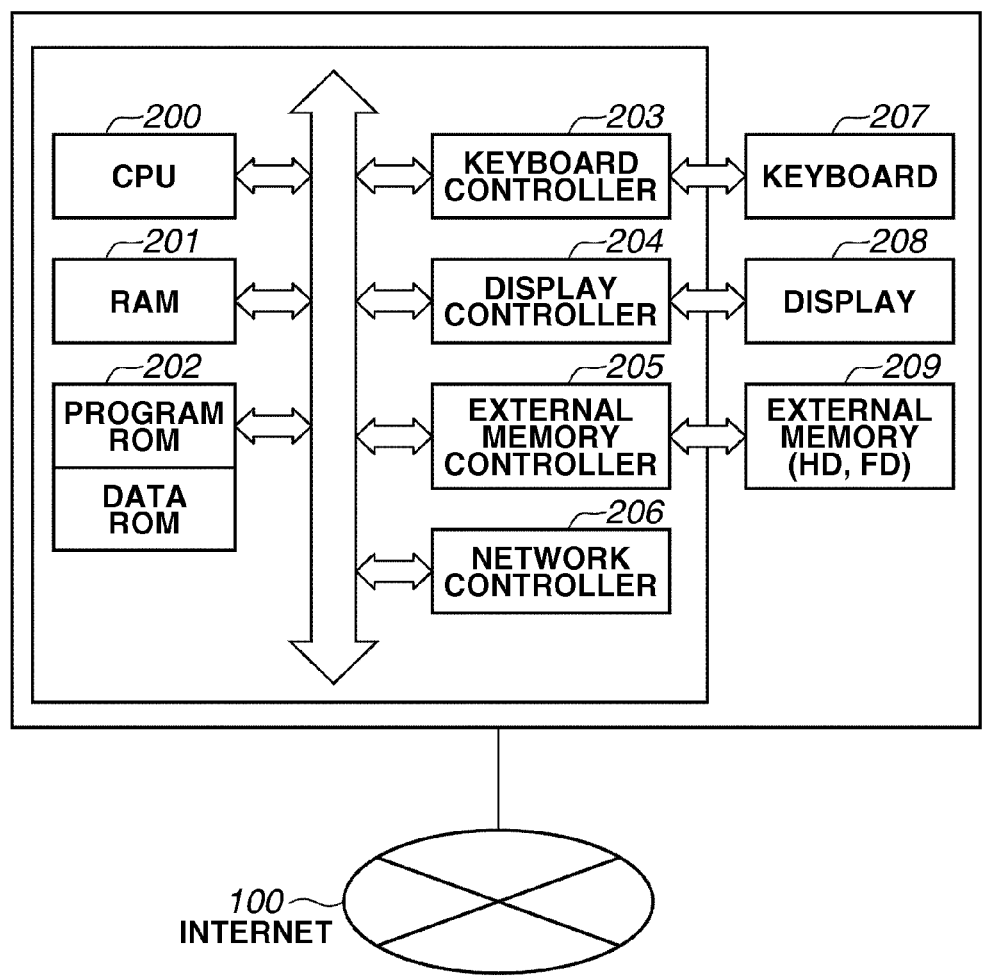
FIG. 2 is a block diagram illustrating an example of the hardware configurations of a host computer, a driverless print server, and a web application server.

FIG. 2 is a block diagram illustrating an example of the hardware configurations of the host computer 110, the driverless print server 140, and the web application server 120. The hardware configuration diagram illustrated in FIG. 2 corresponds to the hardware configuration diagram of a general information processing apparatus.

The hardware configuration of the general information processing apparatus can be applied to the host computer 110, the driverless print server 140, and the web application server 120 in the present exemplary embodiment. The hardware configuration of the driverless print server 140 may also be added to the hardware configuration of the printing apparatus 130 which will be described below.

In FIG. 2, a central processing unit (CPU) 200 executes programs such as an operating system (OS) and an application stored in a read only memory for a program in a ROM 202 or loaded into a random access memory (RAM) 201 by an external memory 209.

The RAM 201 functions as a main memory of the CPU 200, a work area, or the like. A keyboard controller 203 controls key input from a keyboard 207 or a pointing device (not illustrated). A display controller 204 controls various displays on a display 208.

An external memory controller 205 controls data access to the external memory 209 such as a hard disk (HD) and a flexible disk (FD) that stores various types of data. A network controller 206 is connected to the Internet 100 to execute communication control processing with other devices connected to the Internet 100.

By the CPU 200 executing programs, the function of each device such as the host computer 110, the driverless print server 140, and the web application server 120 to be described below and processing according to a flowchart executed by the above-described each device to be described below are realized.

Figure 3:
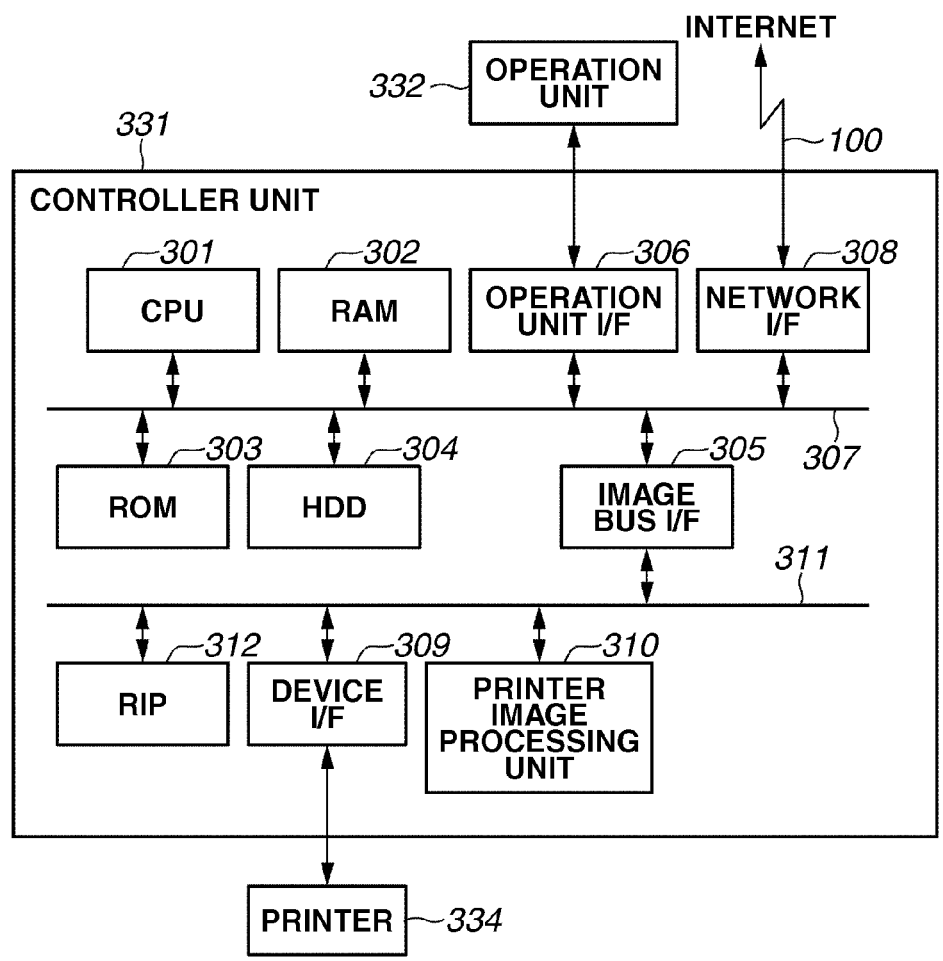
FIG. 3 is a block diagram illustrating an example of the hardware configuration of a printing apparatus.

Next, the hardware configuration of the printing apparatus 130 will be described referring to FIG. 3. FIG. 3 is a block diagram illustrating an example of the hardware configuration of the printing apparatus 130.

The printing apparatus 130 includes the control unit 331 for controlling the whole apparatus as illustrated in FIG. 3. The control unit 331 controls the printer 334 (i.e., image output device). The control unit 331 is also connected to a local area network (LAN) and a public line to execute input/output of image information or device information via these.

The control unit 331 includes a CPU 301. The CPU 301 is connected to a RAM 302, a ROM 303, a hard disk drive (HDD) 304, an image bus interface (I/F) 305, an operation unit I/F 306, and a network I/F 308 via a system bus 307.

The RAM 302 is a memory for providing a work area of the CPU 301. Further, the RAM 302 is also used as an image memory for temporarily storing image data. The ROM 303 is a boot ROM. In the ROM 303, a boot program of a system is stored. In the HDD 304, system software, image data, and the like are stored.

The operation unit I/F 306 is an interface for executing input/output with the operation unit 332. The operation unit I/F 306 outputs image data to be displayed on the operation unit 332 to the operation unit 332, and transmits information input by a user via the operation unit 332 to the CPU 301.

The network interface 308 is connected to the Internet 100 to execute input/output of information from/to the Internet 100.

The image bus I/F 305 is a bus bridge that connects the system bus 307 and an image bus 311 for transferring image data at a high speed, to convert a data structure. To the image bus 311, a raster image processor (RIP) 312, a device I/F 309, and a printer image processing unit 310 are connected.

The RIP 312 rasterizes a page description language (PDL) code received from a network into a bit map image. The device I/F 309 connects the printer 334 and the control unit 331 to execute synchronous/asynchronous conversion of image data. The printer image processing unit 310 executes correction of a printer, resolution conversion, and prints output image data.

By executing programs by the CPU 301, the function of the printing apparatus to be described below and processing according to a flowchart executed by the printing apparatus to be described below, are realized.

Next, the software configurations of the driverless print server 140, the web application server 120, the printing apparatus 130, and the host computer 110 will be described referring to FIG. 4. FIG. 4 is a block diagram illustrating an example of the software configuration of each device that constitutes a printing system.

The driverless print server 140 is constituted of a web server unit 141, a storage method determination unit 142, an acquisition method selection unit 143, a data acquisition unit 144, a web service request unit 145, and the like. These are present as program files stored in the external memory 209 on the driverless print server 140.

An OS or a module that uses the module thereof loads the above-described program files into the RAM 201. Then, the CPU 200 executes these program files (programs).

The web server unit 141 receives an HTTP request from the additional function 112 on the web browser 111 on the host computer 110. The HTTP request from the additional function 112 on the web browser 111 is, for example, GET Method and POST Method. The web server unit 141 calls the storage method determination unit 142.

The storage method determination unit 142 analyzes a URL notified in the HTTP request and displayed on the web browser 111 to determine a storage method. The storage method is a storage method of data different for each web application server 120.

The storage method determination unit 142 refers to a URL filter table 600 as illustrated in FIG. 7, which will be described below. In the URL filter table 600, regular expression of a URL and a storage method are stored associated with each other. The storage method determination unit 142 determines the storage method by determining whether the URL notified from the additional function 112 on the web browser 111 matches the regular expression of the URL stored in the URL filter table 600.

The acquisition method selection unit 143 selects an acquisition method optimal to the storage method determined in the storage method determination unit 142. The acquisition method selection unit 143 refers to an acquisition method table 700 illustrated in FIG. 8.

In the acquisition method table 700, the storage method and the optimal acquisition method are stored associated with each other. The acquisition method selection unit 143 can select the acquisition method optimal to the storage method by referring to the acquisition method table.

The data acquisition unit 144 includes a plurality of data acquisition methods different for each web application server 120. The data acquisition unit 144 may need authorization and authentication information to the web application server 120 to acquire data. In this case, the data acquisition unit 144 displays on the web browser 111 a screen on which a user inputs authorization and authentication information.

The web service request unit 145 transmits a printing control command to a web service provider 132 on the printing apparatus 130 by a web service. At this time, the web service is HTTP communication by using a protocol such as Simple Object Access Protocol (SOAP) and Representational State Transfer (REST).

The web application server 120 is constituted of a web server unit 121, an application server unit 122, a data management unit 123, an authentication unit 125, and the like. These are present as program files stored in the external memory 209 on the web application server 120.

An OS or a module that uses the module thereof loads the above-described program files into the RAM 201. Then, the CPU 200 executes these program files (programs).

The web server unit 121 receives an HTTP request from the web browser 111 on the host computer 110 through the Internet 100, and returns an Http response corresponding to the request to the host computer 110.

The application server unit 122 is called from the web server unit 121 in response to the HTTP request to execute processing. The application server unit 122 returns the dynamically generated HTML to the web server unit 121 as the result of processing.

The data management unit 123 executes management of data required with permanence. Data required with permanence is, for example, document data acquired by the driverless print server 140.

The authentication unit 125 returns an authentication result when receiving a user identification (ID) and a user password. When a user intends to display data stored in the data management unit 123 on the web browser 111 on the host computer 110 for each user, the web server unit 121 displays an authentication screen (not illustrated).

When the user inputs the web user ID and the web user password on the authentication screen displayed on the web browser 111, the authentication unit 125 returns the authentication result. Only when the authentication result is affirmative, the web server unit 121 displays data stored for each user.

Further, the authentication unit 125 determines whether authentication and authorization are affirmative to a data acquisition request with authentication and a data acquisition request with authorization, which will be described below, from the driverless print server 140.

The printing apparatus 130 is constituted of a user interface (hereafter, referred to as UI) 131, a web service provider 132, a control application program interface (API) 133, a job manager 134, a print manager 135, a PDL manager 136, and the like.

These are present as program files stored in the HDD 304 on the printing apparatus 130. An OS or a module that uses the module thereof loads the above-described program files into the RAM 302. Then, the CPU 301 executes these program files (programs).

In the printing apparatus 130, the UI 131 is a module to mediate between a device and a user operation when a user performs various operations and settings to the printing apparatus 130. This UI 131 transfers input information to various types of modules, which will be described below, to execute a request of processing, setting of data, or the like according to the operation of an operator.

The web service provider 132 calls and executes the function of the printing apparatus 130 using the control API 133 according to a web service call from an external client. In the present exemplary embodiment, the external client who calls the web service provider 132 is, for example, the web service request unit 145 on the driverless print server 140.

The control API 133 provides a module such as the web service provider 132 with an interface to a module such as the job manager 134 to be described below. A relationship of dependence between various types of modules is reduced and each fungibility can be increased.

The job manager 134 analyzes various types of processing instructed by the above-described various types of modules via the control API 133 to provide instructions to a module, which will be described below. Further, the job manager 134 collectively manages hardware processing to be executed in the printing apparatus 130.

The print manager 135 manages and controls printing processing instructed by the job manager 134. The PDL manager 136 executes PDL conversion of document data instructed by the job manager 134.

The host computer 110 is constituted of the web browser 111 and the like. The web browser 111 is present as a program file stored in the external memory 209 on the host computer 110. Further, the web browser 111 has the additional function 112.

The additional function 112 is a Bookmarklet or a plug-in. The Bookmarklet is JavaScript which can be registered in a favorite bookmark on the web browser 111. The plug-in is software to extend a tool bar or a context menu on the web browser 111.

A user performs the Bookmarklet or the plug-in on the web browser 111 during display of a web page provided by the web application server 120. The Bookmarklet or the plug-in is performed by a user, thereby having the function of notifying the driverless print server 140 of a URL during display on the web browser 111.

An OS or a module that uses the module thereof loads the above-described program files into the RAM 201. Then, the CPU 200 executes these program files (programs). The web browser 111 is displayed on the display 208 to receive key input from the keyboard 207 or the pointing device (not illustrated) by a user.

Next, a document list screen 400 provided by the web application server 120 will be described referring to FIG. 5. FIG. 5 illustrates an example of the document list screen 400 provided by the web application server 120.

The document list screen 400 is a screen on the web application server 120 displayed by a user on the web browser 111. On the document list screen 400, a user can refer to the list of document data registered beforehand. In the present exemplary embodiment, each document data is formed with a hyperlink.

The link destination of the hyperlink is a document edit screen 500, which will be described below. A user selects the hyperlink of the document data to display the document edit screen 500, whereby the document data can be browsed and edited.

Next, the document edit screen 500 provided by the web application server 120 will be described referring to FIG. 6. FIG. 6 illustrates an example of the document edit screen 500 provided by the web application server 120.

The document edit screen 500 is a screen on the web application server 120 displayed by a user on the web browser 111. On the document edit screen 500, a user edits a document with an operation feeling similar to a document edit application (not illustrated) installed in the host computer 110.

In the present exemplary embodiment, driverless printing is further realized up to printing with an operation feeling similar to that printed from the document edit application installed in the host computer 110. A user performs the additional function 112 on the web browser 111, thereby allowing printing instructions to be executed from the document edit screen 500.

Next, the URL filter table 600 in the driverless print server 140 will be described referring to FIG. 7. FIG. 7 illustrates an example of the URL filter table 600 in the driverless print server 140.

The URL filter table 600 is called and used by the storage method determination unit 142 in order to specify that a URL notified by the additional function 112 on the web browser 111 is which URL of the web application server 120, and to determine a storage method. The storage method is different for each web application server 120.

In a row 601 on the URL filter table 600, regular expression of the URL is retained. In a column 602 on the URL filter table 600, a character string that identifies the storage method of the web application server 120 of a storage destination is stored. The storage method is generally different for each web application server 120.

The driverless print server 140 can dynamically add data in the URL filter table 600 for the URL of the new web application server 120.

Next, the acquisition method table 700 in the driverless print server 140 will be described referring to FIG. 8. FIG. 8 illustrates an example of the acquisition method table 700 in the driverless print server 140.

In the acquisition method table 700, information on the data acquisition method (data acquisition method) optimal to the web application server 120 is retained. The acquisition method selection unit 143 uses the acquisition method table 700 in order to select the data acquisition method determined by the storage method determination unit 142 and optimal to the web application server 120.

In a column 701 on the acquisition method table 700, a character string that identifies the web application server 120 is retained. In a row 702 on the acquisition method table 700, a character string that identifies the acquisition method optimal to the web application server 120 is retained.

In a column 702 on the acquisition method table 700, a character string that identifies the acquisition method is stored. The acquisition method is generally different for each web application server 120.

Further, the web application server 120 may also support a plurality of acquisition methods. However, in the column 702, the optimal acquisition method is stored. The driverless print server 140 can dynamically add data in the acquisition method table 700 for the new web application server 120.

Figure 9:
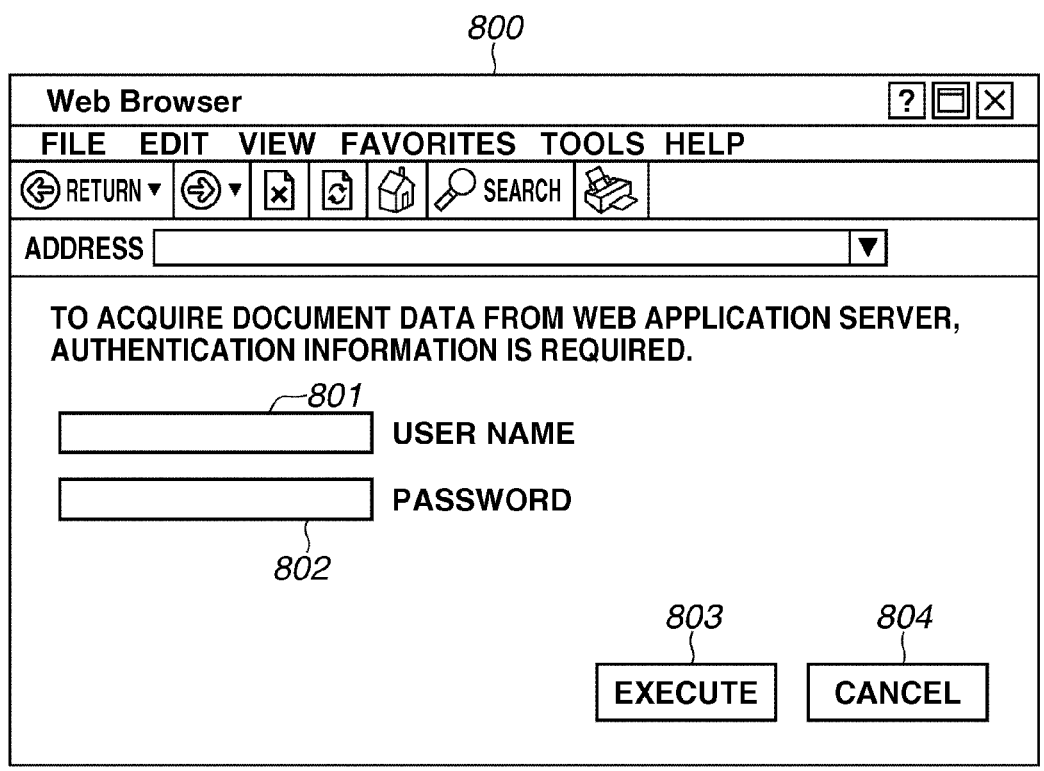
FIG. 9 illustrates an example of an authentication screen provided by a driverless print server.

An authentication screen 800 provided by the driverless print server 140 will be described referring to FIG. 9. FIG. 9 illustrates an example of the authentication screen 800 provided by the driverless print server 140.

The authentication screen 800 is a screen on which a user inputs authentication information so that the driverless print server 140 can acquire document data from the web application server 120 that requires authentication to acquire the document data.

The driverless print server 140 can also retain authentication information to the web application server 120. However, since it is not preferable to register authentication information to a plurality of services from the viewpoint of security, in the present exemplary embodiment, authentication information is input every time.

A text box 801 is a text box is for inputting a user name on the web application server 120 by the user. A text box 802 is a text box for inputting a password on the web application server 120 by the user. An execution button 803 is a button used to transmit information input in the text box 801 and the text box 802 to the driverless print server 140.

A cancel button 804 is a button used to cancel printing processing. When the cancel button 804 is clicked, the web server unit 141 on the driverless print server 140 executes processing to close the authentication screen 800 displayed on the web browser. The processing to close the authentication screen 800 can be described and executed by, for example, JavaScript.

Figure 10:
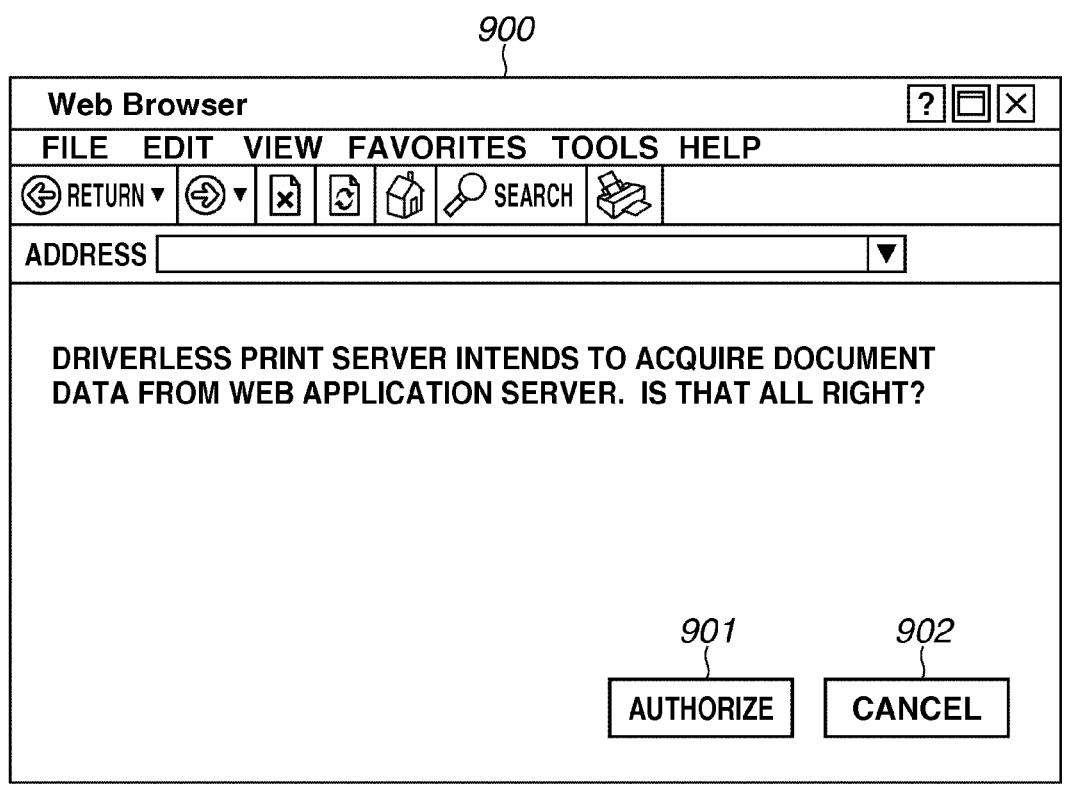
FIG. 10 illustrates an example of an authorization screen provided by a web application server.

An authorization screen 900 provided by the web application server 120 will be described referring to FIG. 10. FIG. 10 illustrates an example of the authorization screen 900 provided by the web application server 120.

The authorization screen 900 is displayed by redirecting the web browser 111 to the authorization screen on the web application server 120 in order that the driverless print server 140 acquires document data from the web application server 120 that requires authorization to acquire the document data.

The driverless print server 140 once transfers processing for authorization to the web application server 120, thereby allowing authorization for document acquisition to be obtained. In the present exemplary embodiment, authorization is obtained as a token.

An authorization button 901 is a button used by a user to authorize to acquire document data stored in the web application server 120 to the driverless print server 140.

When the authorization button 901 is pressed, the web application server 120 performs redirecting using a token that indicates authorization to the driverless print server 140 as a URL parameter. The driverless print server 140 acquires document data required with authorization using this token.

A cancel button 902 is a button used to cancel printing processing. When the cancel button 902 is clicked, the web server unit 141 on the driverless print server 140 executes processing to close the authorization screen 900 displayed on the web browser. The processing to close the authorization screen 900 can be described and executed by, for example, JavaScript.

An acquisition method by the data acquisition unit 144 will be described by an example. In a "basic acquisition method", the data acquisition unit 144 on the driverless print server 140 executes an acquisition request of document data to the web application server 120.

A URL notified from the additional function 112 on the web browser 111 is not a URL of document data itself but a URL of a web page that is used to browse and edit document data.

Thus, when simply executing a HTTP GET request to the URL notified from the additional function 112 on the web browser 111, the data acquisition unit 144 can only acquire HTML file document data of a web page that is used to browse and edit document data. Accordingly, the data acquisition unit 144 generates a URL to acquire document data from the web application server 120.

First, the data acquisition unit 144 extracts a key to uniquely identify a document on the web application server 120. For example, when a URL of a web page used to browse and edit document data is "http://sample.co.jp/?docid=sample.pdf", a key to identify a document becomes "sample.pdf".

In this case, with respect to document data on the web application server 120, a character string following "docid" of a URL parameter is a key to identify a document. Since the key to identify document data has a format different for each web application server, the data acquisition unit 144 includes an extraction method of a key different for each acquisition method.

More specifically, in a case of an "authorization acquisition method", which will be described below, the extraction method of the key is similar to the "basic acquisition method". The data acquisition unit 144 extracts a character string following "docid" of the URL parameter contained in the URL as the key to identify a document. In this case, the above-described character string becomes an example of identification information.

Further, in a case of an "authentication acquisition method", which will be described below, the data acquisition unit 144 extracts a site URL, a folder, and a file name in a site where a document is retained from based on the URL as a key to identify the document. In this case, the site URL, the folder, and the file name each are an example of identification information.

For example, a URL of a web page used to browse and edit document data is "http://sample.co.jp/?url=http://xxx.co.jp/?folder=doc?file name=sample.pdf". In this case, the data acquisition unit 144 extracts a character string following "url" as a site URL. Further, the data acquisition unit 144 extracts a character string following "folder" as a folder (folder name) and a character string following "filename" as a file name.

The data acquisition unit 144 executes an acquisition request of document data to the web application server 120 based on the extracted key. Generally, the web server unit 121 on the web application server 120 that retains document data opens a service to allow an external service to acquire data.

For example, a URL of the service used to acquire document data opened by the web application server 120 is "http://sample.co.jp/DownloadService/". In the above-described case, for example, the designation of an acquisition request has a format of "http://sample.co.jp/DownloadService/docid=sample.pdf".

The acquisition request is, for example, an HTTP GET request. In addition to this, data may also be acquired by a web service using a protocol such as REST and SOAP. The designation method of the acquisition request is generally different for each web application server 120 similar to the key to identify document data.

Thus, the data acquisition unit 144 includes the designation method of the acquisition request different for each acquisition method. Processing when data is acquired by the "basic acquisition method" is described in a first exemplary embodiment.

In an acquisition method "acquisition method with authentication", data is acquired according to a flowchart illustrated in FIG. 13. In the "acquisition method with authentication", the driverless print server 140 allows a user to input authentication information on the web application server 120, thereby executing acquisition of data that requires authentication. At this time, if the driverless print server 140 stores the authentication information input by the user, a trouble of input by the user can be omitted after next time.

However, it is not preferable to store authentication information in a plurality of servers from the viewpoint of security. Thus, in the present exemplary embodiment, authentication information is input every time. However, authentication information may also be configured so as to be stored by the driverless print server 140. A basic data acquisition method is similar to the "basic acquisition method" and hence it will not be described. Processing when data is acquired by the "acquisition method with authentication" will be described in a second exemplary embodiment in detail.

In an acquisition method "acquisition method with authorization", data is acquired according to a flowchart illustrated in FIG. 14. In the "acquisition method with authorization", the driverless print server 140 performs redirecting to the authorization screen 900 on the web application server 120 illustrated in FIG. 8 in order to acquire a token that indicates authorization.

When a user presses the authorization button 901 on the authorization screen 900 displayed on the web browser 111, the web application server 120 generates a token to perform redirecting to the driverless print server 140 as the token being a URL parameter.

The driverless print server 140 extracts the token from the URL parameter to execute the acquisition request of data using the token. The "acquisition method with authorization" has the advantage of saving trouble of input of authentication information by a user compared with the "acquisition method with authentication".

Further, the driverless print server 140 allows a user to authorize to explicitly acquire data from the web application server 120. Thus, security of data is protected. Accordingly, it is desirable to select the "acquisition method with authorization" to the web application server 120 that supports both of the "acquisition method with authentication" and the "acquisition method with authorization".

A basic data acquisition method is similar to the "basic acquisition method" and hence it will not be described. Processing when data is acquired by the "acquisition method with authorization" will be described in a third exemplary embodiment in detail.

A first flow in the present exemplary embodiment will be described referring to a flowchart in FIG. 11. The first flow is a processing flow where a user performs the additional function 112 on the web browser 111, and the driverless print server 140 acquires data to execute printing instructions to the printing apparatus 130.

Figure 11:
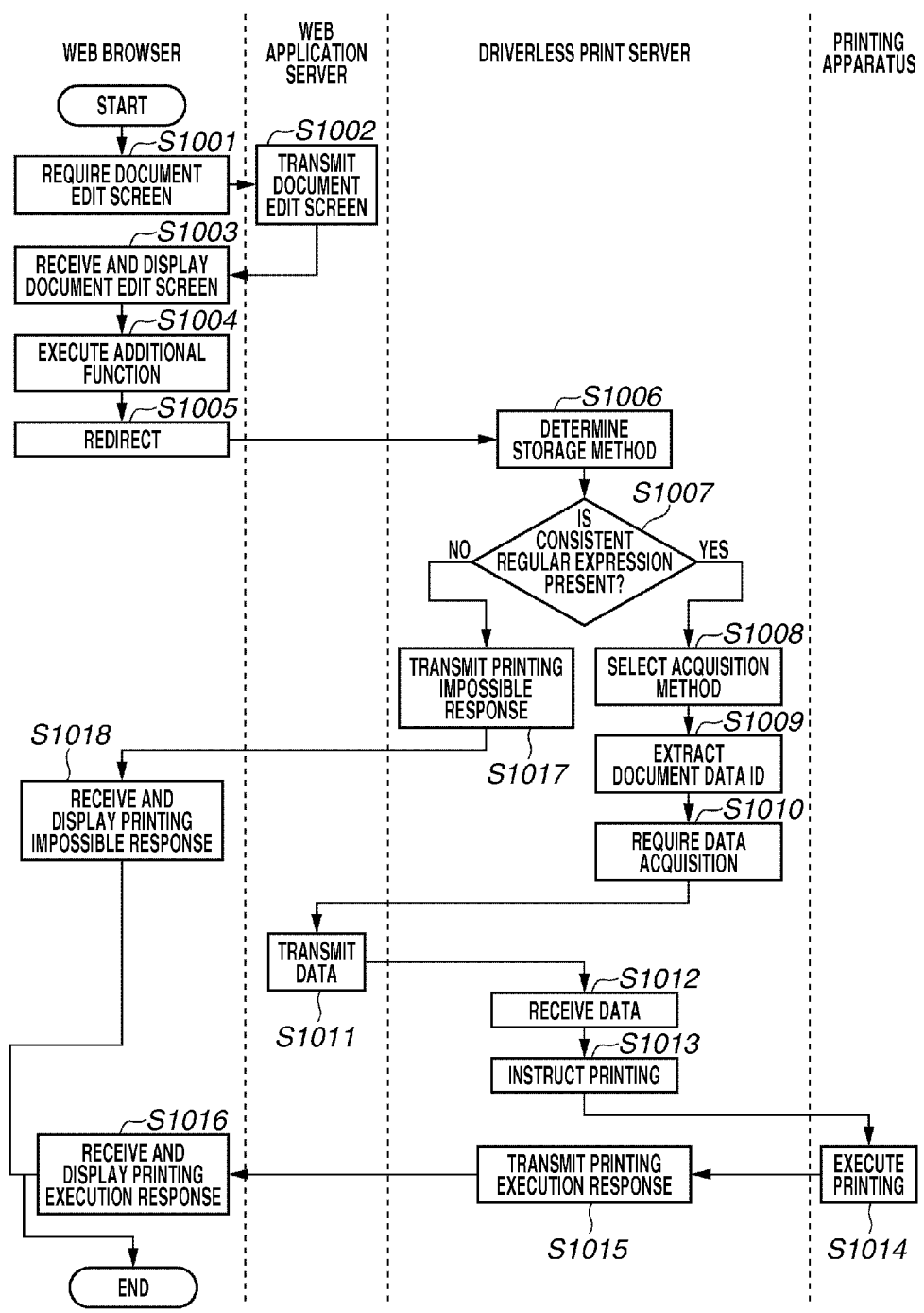
FIG. 11 is a flowchart illustrating an example of information processing according to a first exemplary embodiment.

FIG. 11 is a flowchart illustrating an example of information processing according to the first exemplary embodiment. In the flowchart illustrated in FIG. 11, a user inputs a URL of a document edit screen to the web browser 111. Alternatively, the flowchart is started by selecting a link of a document from the document list screen 400 provided by the web application server 120 as illustrated in FIG. 5.

In step S1001, the web browser 111 on the host computer 110 requires the document edit screen 500 provided by the web application server 120. In FIG. 6, an example of the document edit screen 500 is illustrated.

In step S1002, the web application server 120 transmits the document edit screen 500 to the web browser 111. The web application server 120 transmits the document edit screen as HTML data.

In step S1003, the web browser 111 receives the document edit screen 500. The web browser 111 reads the HTML data on the document edit screen and displays the document edit screen 500.

In step S1004, the additional function 112 on the web browser 111 is executed. The additional function 112 is a Bookmarklet or a plug-in. The Bookmarklet is JavaScript which can be registered in a favorite bookmark on the web browser 111.

The plug-in is a kind of software to extend a tool bar or a context menu on the web browser 11. The Bookmarklet or the plug-in has the function of performing redirecting to the driverless print server 140 as a URL, which is being displayed, being a parameter.

In step S1005, the additional function 112 on the web browser 111 performs redirecting to the driverless print server 140. At this time, the additional function 112 redirects the URL during display on the web browser 111 as a URL parameter.

When redirecting, in the present exemplary embodiment, the additional function 112 adds a URL parameter according to a GET request of the HTTP protocol. However, a POST request may also be executed. When the URL during display is "http://sample.co.jp/?docid=sample.pdf", a URL in the GET request becomes "http://driverless.print.server/?url=http://sample.co.jp/docid=sample.pdf" where "http://driverless.print.server" is a URL of the driverless print server 140.

In step S1006, the driverless print server 140 analyzes the URL parameter notified from the additional function 112 on the web browser 111. First, the web server unit 141 acquires the URL during display on the web browser 111 from the URL parameter of the GET request of the HTTP protocol from the additional function 112 on the web browser 111.

The web server unit 141 calls the storage method determination unit 142 to determine a storage method based on the acquired URL. The storage method determination unit 142 can refer to the URL filter table 600.

The storage method determination unit 142 determines whether the acquired URL is consistent with the regular expression of the URL registered in the URL filter table 600.

When the consistent regular expression of the URL is present, the storage method determination unit 142 reads a character string that identifies the storage method of the web application server 120 related to the regular expression of the URL from the URL filter table 600 to respond to the web server unit 141.

When the consistent URL is not present, the storage method determination unit 142 responds a character string that indicates absence of the consistent regular expression of the URL. In the present exemplary embodiment, for example, a character string of "None" is a character string that indicates absence.

As a result of determination by the storage method determination unit 142, if the consistent regular expression of the URL is present (YES in step S1007), the processing proceeds to step S1008. If the consistent regular expression of the URL is not present (NO in step S1007), the processing proceeds to step S1017.

In step S1008, the web server unit 141 calls the acquisition method selection unit 143 with the storage method acquired in step S1006 serving as an argument. The acquisition method selection unit 143 reads the acquisition method table.

The acquisition method selection unit 143 searches for an acquisition method corresponding to the storage method delivered from the acquisition method table 700 as an argument. The acquisition method selection unit 143 sends as the response the acquisition method to the web server unit 141 as the search result. In each storage method, one optimal acquisition method is certainly registered.

In step S1009, the web server unit 141 extracts a document data ID from the URL during display on the web browser 111 acquired in step S1006. For example, when the URL during display on the web browser 111 is "http://sample.co.jp/docid=sample.pdf", the document data ID becomes "sample.pdf". The document data ID is one example of identification information that identifies document data.

In step S1010, the web server unit 141 calls the data acquisition unit 144 selected by the acquisition method selection unit 143. At this time, the web server unit 141 delivers the document data ID identified in step S1009 as an argument to the data acquisition unit 144.

The acquisition method by the data acquisition unit 144 in the present exemplary embodiment is the "basic acquisition method". In the "basic acquisition method", the URL of the GET request used to acquire a document from the document data ID is generated. For example, when the document data ID is "sample.pdf" and the URL of the service of the web application server 120 used to acquire document data is "http://sample.co.jp/DownloadService/", the URL of the GET request becomes "http://sample.co.jp/DownloadService/docid=sample.pdf".

The data acquisition unit 144 executes the GET request to the URL in step S1010, thereby acquiring document data. However, a plurality of acquisition methods by the data acquisition unit 144 is present other than this. A processing flow by other acquisition methods will be described in the second and third exemplary embodiment in detail.

In step S1011, the web application server 120 transmits document data required from the driverless print server 140.

In step S1012, the web server unit 141 on the driverless print server 140 stores received data. When the driverless print server 140 is included in the printing apparatus 130, the data acquisition unit 144 stores acquired data in the HDD 304 on the printing apparatus 130.

When the driverless print server 140 is not included in the printing apparatus 130, the data acquisition unit 144 stores acquired data in the external memory 209 of the driverless print server 140.

In step S1013, the web server unit 141 instructs the printing apparatus 130 to print document data stored in step S1010. When the driverless print server 140 is included in the printing apparatus 130, the web server unit 141 notifies the printing apparatus 130 of a path-pass that indicates the place of storage in the HDD 304 in which data is stored, thereby executing printing instructions. The path to be notified is expressed as, for example, "Print/document/sample.pdf" or the like.

When the driverless print server 140 is not included in the printing apparatus 130, the web server unit 141 calls the web service request unit 145. The web service request unit 145 instructs the web service provider 132 on the printing apparatus 130 to print document data by a web service.

In step S1014, the printing apparatus 130 prints data notified or instructed to print by the web service, for example, with PDF direct. The PDF direct is a function of allowing PDF document to be directly printed by a printing apparatus without via a printer driver as illustrated in FIG. 12.

Figure 12:
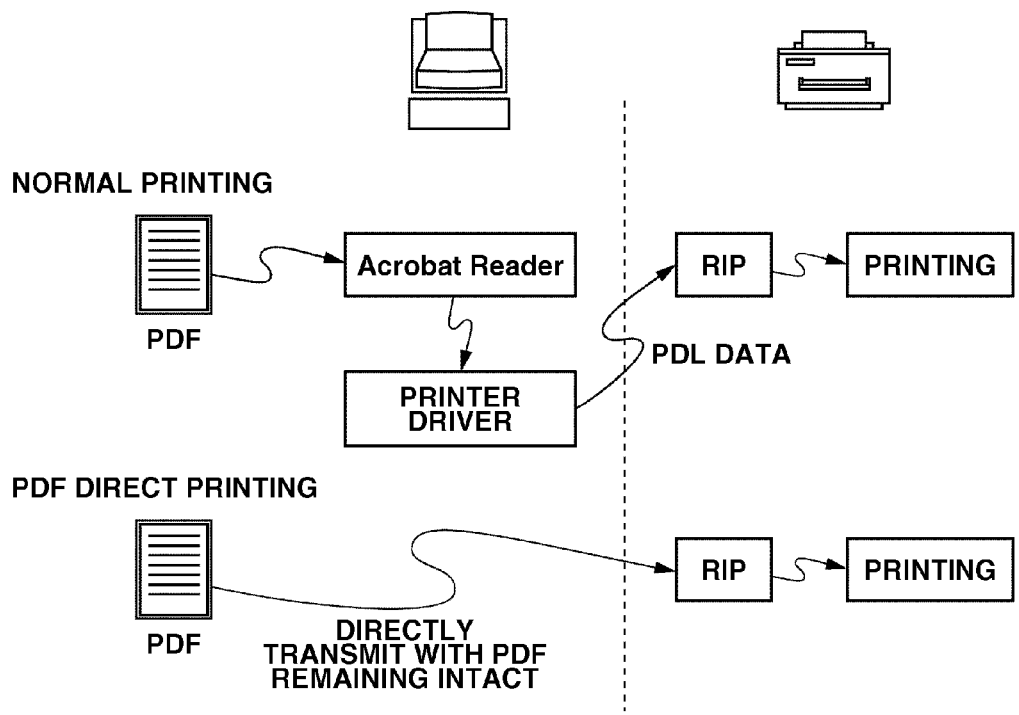
FIG. 12 illustrates PDF direct.

FIG. 12 is a diagram illustrating the PDF direct. The printing apparatus 130 does not necessarily support the PDF direct. Data can also be printed via RIP 312 after the control API 133 on the printing apparatus 130 converts data into a format that can be printed by the PDL manager 136.

In step S1015, the web server unit 141 on the driverless print server 140 transmits HTML data that indicates completion of printing to the web browser 111.

In step S1016, the web browser 111 on the host computer 110 receives the HTML data that indicates completion of printing from the web server unit 141 on the driverless print server 140 and displays it.

In step S1017, the web server unit 141 on the driverless print server 140 transmits the HTML data that indicates a URL where printing is impossible to the web browser 111.

In step S1018, the web browser 111 on the host computer 110 receives the HTML data that indicates a URL where printing is impossible from the web server unit 141 on the driverless print server 140 to display it.

As described above, in the first flow, a user performs the additional function 112 on the web browser 111, and the driverless print server 140 acquires data to instruct the printing apparatus 130 to print it. Subsequently, the printing apparatus 130 prints it according to the printing instructions to allow driverless printing to be executed.

A second flow in the present exemplary embodiment will be described referring to a flowchart in FIG. 13. FIG. 13 is a flowchart illustrating an example of information processing according to a second exemplary embodiment. The flow in FIG. 13 is started when the acquisition method selection unit 143 selects the "acquisition method with authentication" in step S1008 in the first flow in the first exemplary embodiment. The flow until the second flow is started is similar to steps S1001 to S1009 in the first flow, and hence the description thereof is omitted.

In step S2001, the data acquisition unit 144 on the driverless print server 140 executes an acquisition request of document data to the web application server 120. The acquisition request of document data is, for example, a GET request of a Hypertext Transfer Protocol (HTTP) protocol. For example, when document data ID is "sample.pdf", a URL of the GET request becomes "http://sample.co.jp/DownloadService/docid=sample.pdf".

In step S2002, the web application server 120 returns a response which indicates that authentication is required to the acquisition request of document data from the data acquisition unit 144 on the driverless print server 140. Requirement of authentication is indicated, for example by responding an HTTP status code 401.

In step S2003, the data acquisition unit 144 on the driverless print server 140 generates the authentication screen 800 illustrated in FIG. 9 to allow a user to input authentication information on the web application server 120.

In step S2004, the data acquisition unit 144 on the driverless print server 140 transmits HTML data of the authentication screen 800 to allow a user to input authentication information on the web application server 120.

In step S2005, the web browser 111 receives and displays the HTML data of the authentication screen 800.

In step S2006, a user inputs authentication information into a text box 801 and a text box 802 on the authentication screen 800m, and presses an execution button 803. When the execution button 803 is pressed, the web browser 111 transmits authentication information to the driverless print server 140. Authentication information is, for example, a user ID and a password.

In step S2007, the driverless print server 140 receives authentication information used to acquire document data on the web application server 120. At this time, if the driverless print server 140 stores the authentication information input by the user, a trouble of input by the user can be omitted next time or later. However, it is not preferable to store authentication information in a plurality of servers from the viewpoint of security. Thus, in the present exemplary embodiment, authentication information is input every time. However, authentication information may also be configured so as to be stored by the driverless print server 140.

In step S2008, the data acquisition unit 144 on the driverless print server 140 executes an acquisition request of data with authentication information to the web application server 120. The acquisition request of data with authentication is, for example, a GET request of the HTTP protocol with which authentication information is added on a header.

In step S2009, the web application server 120 transmits document data required from the data acquisition unit 144 on the driverless print server 140. In step S2010, the data acquisition unit 144 on the driverless print server 140 receives document data from the web application server 120. After completion of the second flow, subsequently, a processing flow similar to steps S1013 to S1016 in the first flow is executed.

As described above, in the second flow, the driverless print server 140 can acquire document data from the web application server 120 that requires authentication to acquire document data. Thus, a driverless printing function can be provided to a user who uses the web application server 120 that requires authentication.

A third flow according to the present exemplary embodiment will be described referring to a flowchart in FIG. 14. FIG. 14 is a flowchart illustrating an example of information processing according to a third exemplary embodiment.

The flow in FIG. 14 is started when the acquisition method selection unit 143 selects the "acquisition method with authorization" in step S1008 in the first flow in the first exemplary embodiment. The flow until the third flow is started is similar to that of steps S1001 to S1009 in the first flow and hence it is omitted.

In step S3001, the data acquisition unit 144 on the driverless print server 140 executes a redirect response to the authorization screen 900 illustrated in FIG. 10 provided by the web application server 120 to the web browser 111. In step S3002, the web browser 111 executes an acquisition request of the authorization screen 900 to the web application server 120 according to the redirect response in step S3001.

In step S3003, the web application server 120 transmits data of the authorization screen 900 to the web browser 111. In step S3004, the web browser 111 receives and displays the data of the authorization screen 900.

In step S3005, when a user presses the authorization button 901 on the authorization screen 900, the web browser 111 notifies the web application server 120 of the authorization button 901 being pressed.

In step S3006, the web application server 120 receives information indicating that the authorization button 901 is pressed. The fact that the authorization button 901 is pressed is notified with, for example, a POST request of the HTTP protocol.

In step S3007, the web application server 120 issues a token to indicate authorization. The token is issued as a certification indicating that the driverless print server 140 is authorized in order to acquire document data on the web application server 120.

In step S3008, the web application server 120 redirects the token that indicates authorization to the driverless print server 140 as a URL parameter.

In step S3009, the data acquisition unit 144 on the driverless print server 140 reads the token issued in step S3007 from the URL parameter as authorization information for the acquisition request of data with authorization information. Subsequently, the data acquisition unit 144 executes the acquisition request of data with authorization information to the web application server 120. The acquisition request of data with authorization information is, for example, a GET request of the HTTP protocol with which the token that indicates authorization is added on a header. In step S3010, the web application server 120 transmits required document data to the data acquisition unit 144 on the driverless print server 140. In step S3011, the data acquisition unit 144 on the driverless print server 140 receives document data from the web application server 120.

After completion of the third flow, subsequently, a processing flow similar to steps S1013 to S1016 in the first flow is executed.

As described above, in the third flow, the driverless print server 140 can acquire document data from the web application server 120 that requires authorization to acquire the document data. Thus, a driverless printing function can be provided to a user who uses the web application server 120 that requires authorization.

Further, embodiments can be realized by executing the following processing. That is, software (program) that realizes a function in the above-described exemplary embodiments is supplied to a system or an apparatus via a network or various types of storage mediums, and a computer (or a central processing unit (CPU), a micro processing unit (MPU) or the like) on the system or the apparatus reads the program and execute it.

According to the above-described exemplary embodiments, a function of driverless printing can be provided to a user who uses a web application for editing a document or the like.

Preferable exemplary embodiments of the present invention have been described above in detail. However, the present invention is not limited to specific exemplary embodiments. Various modifications and changes may be made in the scope of the subject matter of the present invention defined in the claims.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. In an example, a computer-readable medium may store a program that causes a print server apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-189474 filed Aug. 26, 2010, which is hereby incorporated by reference herein in its entirety.

What is claimed is:

1. A print server apparatus comprising:
  a receiving unit configured to receive, from a client device, a uniform resource locator (URL) displayed on an edit screen, wherein the URL is other than a URL of a document and wherein the edit screen is provided to the client device by a web application on a web application server and is displayed on a web browser of the client device to permit a user of the client device to execute edit processing of the document through the displayed edit screen;
  an extraction unit configured to extract, from the received URL, identification information that is configured to be used to identify location of document data corresponding to the document;
  an acquisition unit configured to acquire, from the web application server that provided the edit screen to the client device, the document data whose location in the web application server is identified using the extracted identification information; and
  an instruction unit configured to instruct, in a case of printing the acquired document data a printing apparatus to print the acquired document data; and
  a determination unit configured to determine a storage method of the document data by determining whether the received URL is consistent with a regular expression of a preregistered URL, wherein, when the received URL is not consistent with a regular expression of pre-registered URLs, the receiving unit transmits, to the web browser of the client device, a response indicating that printing is impossible.

2. The print server apparatus according to claim 1, further comprising a selection unit configured to select an acquisition method of the document data based on the received URL,
  wherein the acquisition unit acquires the document data identified by identification information from a web application server that provides the edit screen to the web browser according to the acquisition method of the document data selected by the selection unit.

3. The print server apparatus according to claim 2, wherein the extraction unit extracts identification information that identifies document data of the document from the received URL according to the acquisition method of the document data selected by the selection unit.

4. The print server apparatus according to claim 1, wherein the received URL is of a hypertext markup language file of a web page configured to be used to browse and edit document data.

5. The print server apparatus according to claim 1, wherein the extraction unit extracts from the received URL, as identification information, at least one of a site URL, a folder, and a file name in a site where a document is retained.

6. The print server apparatus according to claim 1, wherein the extraction unit extracts from the received URL, as identification information, a value of a parameter specified in the received URL.

7. The print server apparatus according to claim 1, wherein the instruction unit instructs the printing apparatus to print the acquired document data via driverless printing without installing a printer driver.

8. The print server apparatus according to claim 1, wherein the acquisition unit acquires the document data according to a basic acquisition method where a URL of a GET request used to acquire a document from the identification information is generated.

9. The print server apparatus according to claim 1, wherein the receiving unit receive the URL from the client device in response to the web browser performing redirecting in which an additional function of the web browser redirects the URL, as a URL parameter, during display on the web browser to the receiving unit.

10. The print server apparatus according to claim 1, further comprising a selection unit configured to select an acquisition method of the document data based on a storage method determined by the determination unit.

11. The print server apparatus according to claim 1, wherein, in a case of printing the acquired document data, the receiving unit receives data indicating completion of printing from the printing apparatus and transmits the data indicating completion of printing to the web browser of the client device.

12. A control method for a print server apparatus, the control method comprising:
   receiving, from a client device, a uniform resource locator (URL) displayed on an edit screen, wherein the URL is other than a URL of a document and wherein the edit screen is provided to the client device by a web application on a web application server and is displayed on a web browser of the client device to permit a user of the client device to execute edit processing of the document through the displayed edit screen;
   extracting, from the received URL, identification information that is configured to be used to identify location of document data corresponding to the document;
   acquiring, from the web application server that provided the edit screen to the client device, the document data whose location in the web application server is identified by the extracted identification information;
   instructing, in a case of printing the acquired document data, a printing apparatus to print the acquired document data; and
   determining a storage method of the document data by determining whether the received URL is consistent with a regular expression of a preregistered URL, wherein, when the received URL is not consistent with a regular expression of preregistered URLs, receiving includes transmitting, to the web browser of the client device, a response indicating that printing is impossible.

13. A non-transitory storage medium storing a program to cause a computer to execute a control method, the control method comprising:
   receiving, from a client device, a uniform resource locator (URL) displayed on an edit screen, wherein the URL is other than a URL of a document and wherein the edit screen is provided to the client device by a web application on a web application server and is displayed on a web browser of the client device to permit a user of the client device to execute edit processing of the document through the displayed edit screen;
   extracting, from the received URL, identification information that is configured to be used to identify location of document data corresponding to the document;
   acquiring, from the web application server that provided the edit screen to the client device, the document data whose location in the web application server is identified by the extracted identification information;
   instructing, in a case of printing the acquired document data, a printing apparatus to print the acquired document data; and
   determining a storage method of the document data by determining whether the received URL is consistent with a regular expression of a preregistered URL, wherein, when the received URL is not consistent with a regular expression of preregistered URLs, receiving includes transmitting, to the web browser of the client device, a response indicating that printing is impossible.

* * * * *